No. 873,007.  
PATENTED DEC. 10, 1907.  
E. BAUSCH.  
MICROSCOPE.  
APPLICATION FILED APR. 25, 1907.  
2 SHEETS—SHEET 1.
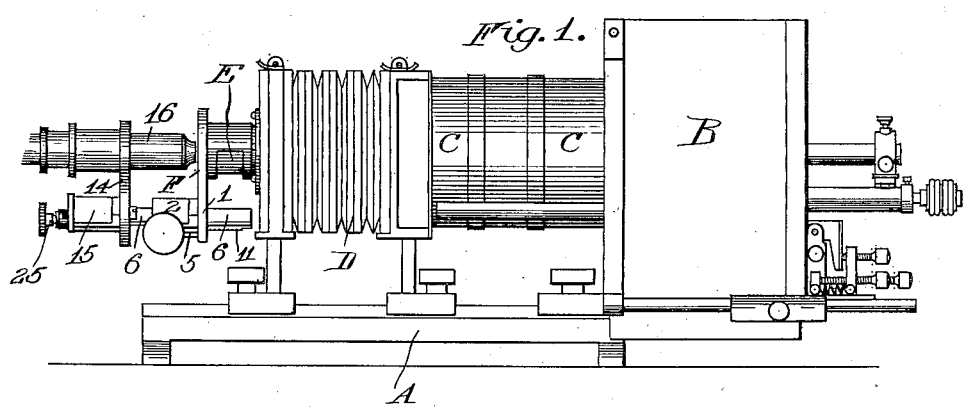
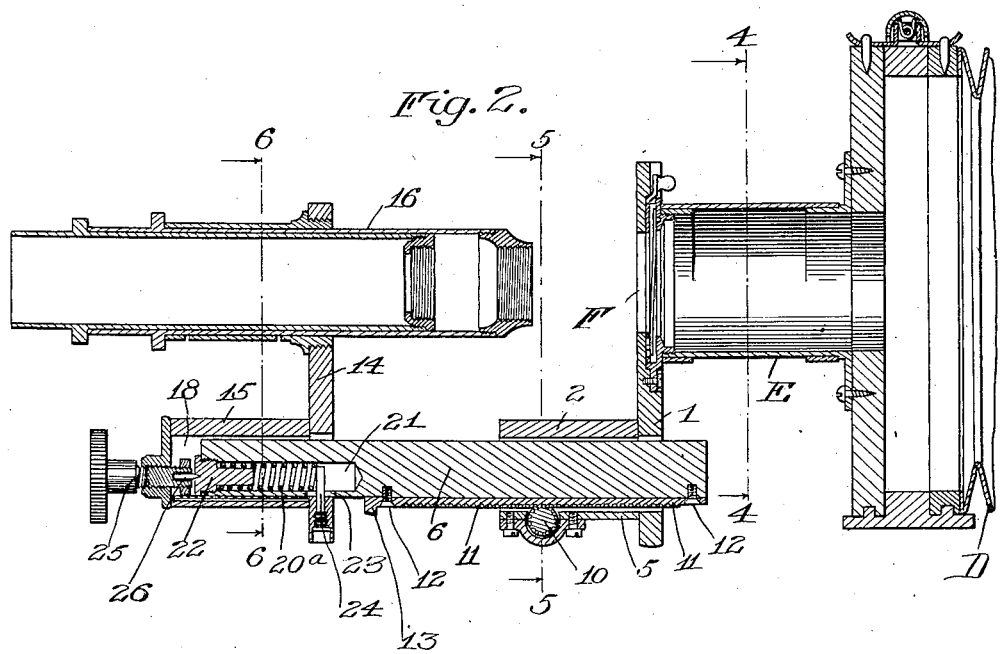
Witnesses  
Walter B. Payne.  
H. H. Simms
Inventor  
Edward Bausch.  
By Church & Rich  
his Attorneys

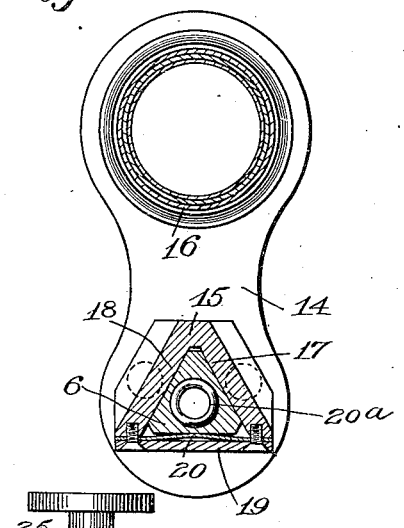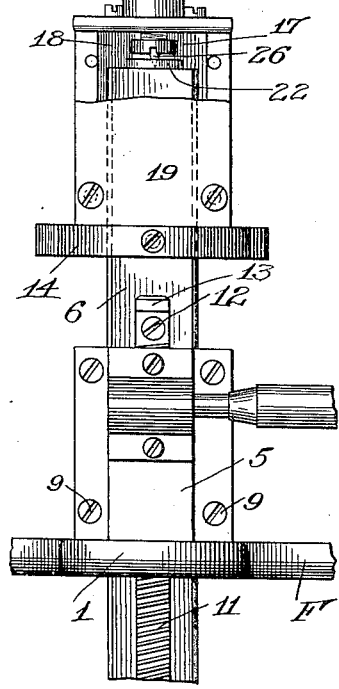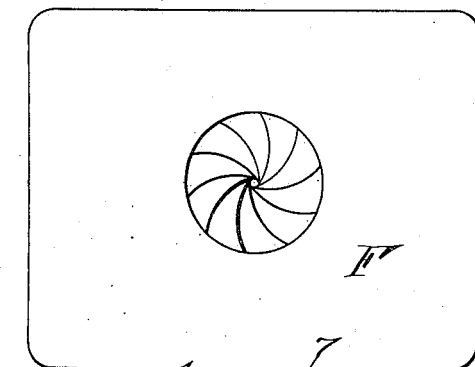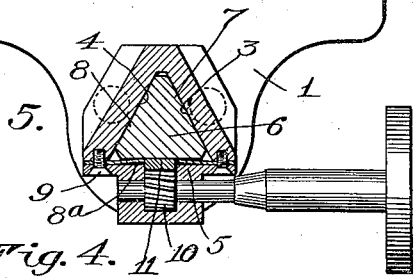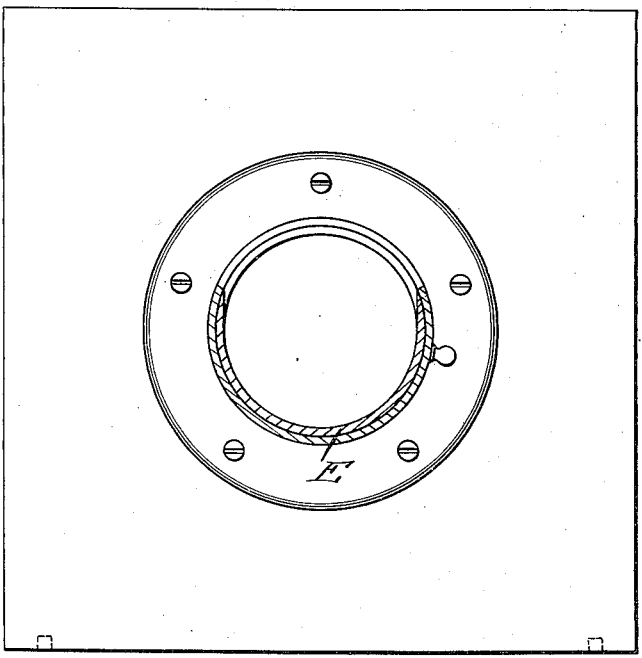

UNITED STATES PATENT OFFICE.

EDWARD BAUSCH, OF ROCHESTER, NEW YORK, ASSIGNOR TO BAUSCH & LOMB OPTICAL COMPANY, OF ROCHESTER, NEW YORK, A CORPORATION OF NEW YORK.

MICROSCOPE.

No. 873,007.   Specification of Letters Patent.   Patented Dec. 10, 1907.

Application filed April 25, 1907. Serial No. 370,199.

*To all whom it may concern:*

Be it known that I, EDWARD BAUSCH, of Rochester, in the county of Monroe and State of New York, have invented certain new and useful Improvements in Microscopes; and I do hereby declare the following to be a full, clear, and exact description of the same, reference being had to the accompanying drawings, forming a part of the specification, and to the reference-numerals marked thereon.

This invention relates to microscopes and more particularly to that type in which there is provided a coarse adjusting mechanism and a fine adjusting mechanism, Accurate microscopes are very expensive and one of the causes for this is, that heretofore the guide faces for the fine adjustment and the guide faces for the coarse adjustment have been separate; and, as these guide faces have to be true to a very small fraction of an inch, the making of the two sets of guide faces requires a great deal of labor.

The object of this invention, therefore, is to provide a slide having a guide face common both to the fine adjusting mechanism and to the coarse adjusting mechanism, whereby a saving of labor is obtained and the cost of manufacture of the instrument is reduced.

A further object is to provide means which will hold a slide against its coöperating guiding faces under yielding pressure, thus preventing undue movement of the slide and securing greater accuracy in the instrument.

With these and other objects in view, the invention consists of the parts and combinations of parts shown in the accompanying drawings, hereinafter described, and more particularly pointed out in the appended claims.

In the drawings: Figure 1 is a side elevation of a projection apparatus, employing a projection microscope made in accordance with this invention. Fig. 2 is a vertical section through the optical axis of the microscope, and those parts of the projection apparatus to which the microscope is secured. Fig. 3 is a bottom view of the microscope with parts broken away. Fig. 4 is a transverse vertical section on the line 4—4 of Fig. 2. Fig. 5 is a like section on the line 5—5 of Fig. 2, and Fig. 6 is a like section on the line 6—6 of Fig. 2.

While the invention is herein shown and described as used in projection apparatus, it is to be understood that with slight changes it may be adapted for any other purpose for which microscopes are used.

With particular reference to the drawing, A indicates the optical bench of a suitable projection apparatus, B the illuminator, C the lens condensing system, D the extensible bellows, and E the sub-stage having the usual stage F at its outer end.

Depending from the stage is a suitable support preferably comprising a depending arm 1 and a housing 2 projecting forwardly from the arm. This housing is formed with a pair of guide faces 3 and 4 arranged at an angle to each other and parallel to the optical axis of the apparatus, a removable wall 5 being provided to permit a slide 6 to be fitted within the housing 2 with the guide faces 7 and 8 of the slide in engagement with the guide faces 3 and 4 of the housing. The guide faces 7 and 8 are arranged at the same angle as the guide faces 3 and 4 of the housing and are pressed against said faces 3 and 4 by yielding pressure devices 8ª which are preferably in the form of leaf springs secured in the housing as, for instance, by the screws 9, the latter serving also to secure the removable wall 5.

To provide for the coarse adjustment of the microscope, the housing 2 also carries a manually operable gear wheel 10 which has its axis arranged transversely of the direction of movement of the slide, and which forms part of a coarse adjusting mechanism comprising also a rack 11 secured to the slide in any suitable manner, as by screws 12; said rack having at its forward end, if desired, a lug 13 which engages the housing and limits the movement of the slide toward the stage.

Supported upon the outer end of the slide is a microscope mounting which preferably comprises an upright 14 and a housing 15. The upright 14 carries at its upper end a suitable microscope 16 and has the housing 15 projecting forwardly therefrom. For fine adjustment, this housing 15 coöperates with the same guide faces of the slide as does the support, and like the housing on the support, is provided with a pair of guide faces 17 and 18 arranged at an angle to each other, parallel with the optical axis of the apparatus and in alinement with the guide faces on the support. This housing also has a removable wall 19 which carries a yielding pressure device 20 in the form of a spring pressing the guiding faces of the slide 6 against the guiding faces of the housing 15.

The microscope mounting is pressed in one direction, as for instance, toward the stage, by means of a helical spring 20 which is mounted in a longitudinal pocket or bore 21 in the free end of the slide, said pocket being closed at its outer end by a screw plug 22 and having a lateral opening 23. Through this lateral opening projects an abutment 24 in the form of a bolt carried by the housing. To obtain a fine adjustment there is provided an adjusting screw 25 having its axis parallel to the longitudinal axis of the slide and mounted in the front end wall of the housing to bear, through the medium of a pin 26, against the spring abutment plug 22 before mentioned. This adjusting screw or device 25 is provided with a finger piece which when turned in one direction causes the microscope to move away from the stage and when turned in the other direction causes the microscope to move toward the stage, the spring 20 in one instance being compressed and in the other instance expanding.

I claim as my invention:

1. In a microscope, a suitable support, a microscope mounting, a slide having a guiding face common to the support and to the microscope mounting, and fine and coarse adjusting mechanisms controlling the adjustment of the parts.

2. In a microscope, a support, a slide adjustable longitudinally in the support, coarse adjusting mechanism for moving the slide, a microscope mounting adjustable longitudinally of the slide, and a fine adjusting mechanism for moving the microscope mounting.

3. In a microscope, a suitable support, a slide adjustable longitudinally in the support, coarse adjusting mechanism for the slide, a microscope mounting adjustable on the slide, and a screw for fine adjustment, carried by the microscope mounting.

4. In a microscope, a suitable support having a pair of guide faces arranged at an angle to each other, a suitable microscope mounting having a pair of guide faces also arranged at an angle to each other, and a slide having a pair of guide faces arranged at an angle to each other and coöperating with the guide faces on both the support and the mounting.

5. In a microscope, a suitable support, a slide guided on the support, a microscope mounting guided on the slide and having its guiding faces alined with the guiding faces on the support, and fine and rough adjusting mechanisms, one for controlling the movement of the slide on the support and the other for controlling the movement of the microscope mounting on the slide.

6. In a microscope, a part having a pair of guide faces arranged at an angle to each other, a slide having guiding faces coöperating with said guide faces on said part, and a yielding pressure device holding the slide firmly against the guide faces of said part.

7. In a microscope, a housing having a pair of guide faces arranged at an angle to each other and a removable wall, and a slide having guide faces coöperating with the guide faces in the housing and held to said guide faces by the removable wall.

8. In a microscope, a housing having a pair of guide faces arranged at an angle to each other and a removable wall, a slide having guide faces coöperating with the guide faces on the slide, and a yielding pressure device holding the slide against the guide faces of the housing and held in the housing by the removable wall.

9. In a microscope, a housing having a pair of guide faces arranged at an angle to each other and a removable wall, a slide having guide faces coöperating with the guide faces in the housing, and a spring arranged between the removable wall and the slide.

10. In a microscope, a slide having a pocket near one end provided with a lateral outlet, a spring arranged in the pocket, a microscope mounting guided on the outer side of the slide and having an abutment projecting through the lateral outlet and pressed by the spring and a fine adjusting screw carried by the housing and engaging the end of the slide.

11. In a microscope, the combination with a housing having a pair of guide faces arranged at an angle to each other and a removable wall, of a slide having guide faces coöperating with the guide faces in the housing and held to said guide faces by the removable wall, a gear wheel carried by the removable wall, and a rack on the slide engaged by the gear wheel.

EDWARD BAUSCH.

Witnesses:
C. M. WAGNER,
W. G. WOODWORTH.